April 17, 1934.       C. BUGAUD       1,954,916
INTERNAL COMBUSTION ENGINE
Filed Aug. 31, 1929

C. Bugaud
INVENTOR

By: Marks & Clerk
Attys.

Patented Apr. 17, 1934

1,954,916

UNITED STATES PATENT OFFICE 1,954,916

INTERNAL COMBUSTION ENGINE

Charles Bugaud, St.-Germain-sur-Morin, France

Application August 31, 1929, Serial No. 389,772
In France December 5, 1928

1 Claim. (Cl. 123—191)

It is known that the use of heavy fuels of the gas-oil type in low compression engines has given poor, if not entirely useless results, as a result of a series of disadvantages which will be briefly set forth below.

1. The starting up of the engine must be effected with a light fuel in order to obtain the necessary preliminary heating of the gas and liquids admitted. This preheating produces a loss of power. Moreover, the lack of regularity in heavy fuels makes the engine hard to start up again readily or to run at varying powers. When the heating is insufficient (when there is a small charge), liquid which has not been entirely vaporized is introduced into the cylinder. A strong condensation is then produced and a considerable loss of fuel which passes into the crank case past the cylinder and the piston, together with a loss in fuel, tightness of the rings, and a considerable pollution of the lubricating oils. At the moment of starting up again, the fuel and air mixture is introduced in a larger quantity, thus increasing the condensation and making it almost impossible to ignite the mixture and making the engine hard to start.

2. Automatic running on full "load" cannot be effected except under exceptional circumstances, because it produces too great an increase in the heating temperature.

3. A constant running under half-load cannot be effected in a practicable manner, because of the high loss of fuel, only the most volatile components alone being vaporized. The consumption of fuel is excessive and completely out of proportion to the power developed.

4. It is not possible to employ a light fuel on half-load on account of the method of heating present which produces an uncertain feed of the mixture, thereby producing only a small power for an excessive consumption of fuel.

5. The fuel admitted cannot be burnt in proportions corresponding to good efficiency. This incomplete combustion causes the piston rings to become fouled. This incomplete combustion causes the piston rings to become worn, with a resultant diminution in their efficiency as a fluid sealing means, and a loss of fuel by its passage into the crank case of the engine; and the cylinder heads, plugs etc. also become fouled with carbon.

6. The loss of power indicated in paragraphs 1 and 5 is further increased by the reduction in the volume of air admitted.

7. The distillation of the fuel before its combustion causes carbon to be liberated which is deposited upon the cylinder walls, piston, and cylinder head, producing a reduction in the volume of the explosion chamber, and an increase in the compression ratio; and the engine knocks and stops. In order to prevent this knocking action, as far as possible, it has been sought to inject water into the cylinder, but this is no longer practicable when running on full, or nearly full load because the vaporization of water is insufficient at low heating temperatures.

It has been sought to reduce these serious disadvantages by the use of double carburettors operating in combination with two different fuels that is the use of, a heavy fuel and a light fuel. The disadvantages mentioned above during the running on "full load", remain however, because the light fuel is not present at such periods.

For smaller loads, with the same types of double carburettors, the light fuel only serves as a means for making easy ignition, but under these conditions the cost per "horse power" hour is too high, and in addition such an arrangement is complicated and delicate in use.

The object of the present invention is to permit the following advantages to be obtained in low compression engines:

(a) The practical and economical use of heavy fuels employed in a continuous manner, for all running conditions and without it being necessary to preheat either the liquid or the gaseous mixture by themselves, or both of them together.

(b) The disadvantages resulting from insufficient combustion can be removed.

(c) The continuous use of a light fuel, such as gasoline, for all degrees of power requirements, while keeping the consumption of fuel at a normal value.

(d) The changing over from the use of a light fuel, to a heavy fuel without stopping the engine under load.

(e) All these results are obtained without modifying the adjustment of the carburettor.

The invention essentially consists in introducing the air-gasoline, or air-oil mixture which has been formed by means of the vaporizing device mounted upon the engine (such as gasoline carburettor) into the interior of the engine cylinder by compelling it to pass through a device which secures the distribution, and the vaporization at a constant previously chosen temperature.

This device will generally be encountered by the mixture after the latter has passed through the inlet valve and before it passes into the cylinder.

The device is formed by a hollow casting, the concave side of which faces the carburettor. In this hollow casting, which may be of any suitable form, a series of slots or apertures are provided, the design of said slots being such that they deliver the gaseous mixture into the cylinder in the form of spiral jets, thus producing a mixing and turbulence of the gases which assists in rendering the vaporized mixture homogeneous in character.

Further, the design of the slots just mentioned is such that the said spiral jets of mixing fuel and air are not projected upon the engine walls of the cylinder, but only reach the latter at the lowest point of the outstroke of the piston. In this way the formation of scale upon the cylinder walls, cylinder head, etc., is avoided.

The present auxiliary device may advantageously be formed by a conical cap covering the inlet valve and provided with helical slots which produce the spiral mixing of the fuel and air, these slots all passing through the apex of the cone, which is the common outlet point for the spiral jets of the mixture. By means of this device the fuel gases are vaporized spontaneously in the absence of any preliminary heating, and without producing any objectionable adherence of the combustible mixture to the walls of the explosion chamber of the engine.

The dimensions of the conical cap are chosen so that the surface of same in contact with the cylinder head will be sufficient for a constant temperature to be maintained in said conical cap, and to neutralize any temperature effect changes in external temperature may produce.

However, it will be readily understood that this does not mean that the temperature of the conical cap does not vary, which would obviously be impossible. The temperature of the conical cap is maximum at the time of the explosion and minimum at the end of the induction stroke. But that maximum temperature and that minimum temperature and all intermediate temperatures are always the same under all conditions of working of the engine. In other words, for a cycle of the engine, the temperature of the conical cap varies according to a certain curve and that curve remains the same under all conditions of working of the engine.

The accompanying drawing illustrates by way of example and in a non-limiting manner, one mode of application of the invention to an internal combustion engine cylinder.

In the drawing, it has been assumed that the inlet valve is placed at the centre of the cylinder head, which is its most favourable position for protecting the walls of the cylinder.

Figure 1:
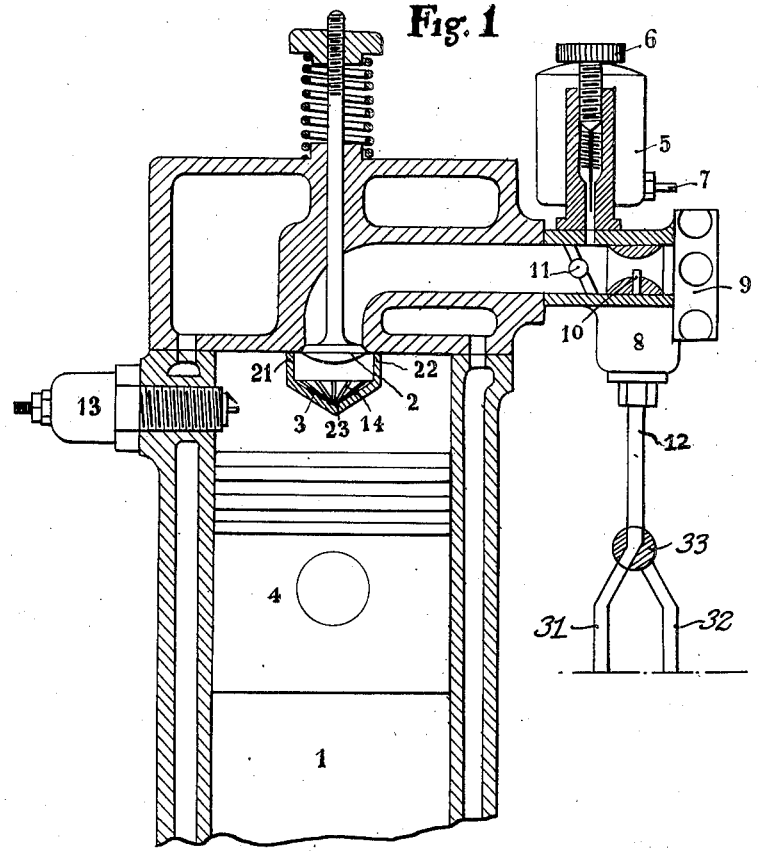
Fig. 1 is a cross section through an engine cylinder showing the fuel supply parts and the distributor-vaporizer cap according to my invention.

1 is the cylinder, 2 the inlet valve, 3 the distributing cap, 4 the piston, 5 a constant level device for the automatic injection of water in a well known manner, 6 is a water regulating screw, 7 is the water inlet, 8 the carburettor, 9 the carburettor air inlet, 10 the fuel jet, 11 the throttle, 12 the fuel inlet, and 13 the spark plug.

Fuel inlet 12 may be connected, through valve 33, either with the light fuel inlet pipe 31 or with the heavy fuel inlet pipe 32.

The helical grooves in the conical cap or casting 3 are shown at 14.

Figure 2:
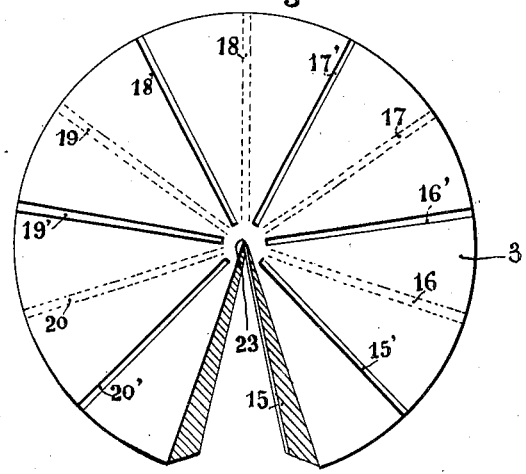
Fig. 2 shows a "development" of the conical portion of the conical cap or casting drawn on an enlarged scale.

In Fig. 2, the dotted lines 15, 16, 17, etc., designate the lines of the helical slots 14 on the inner face (inlet valve side) of the conical cap; the full lines 15', 16', 17', etc., indicating the corresponding outlet lines of said slots on the outer face of the conical cap (cylinder side). It is seen that each of these slots 14 follows a helical path through the wall of conical cap 3, that is to say a path inclined with respect to a radial plane passing through its top radial orifice, the inner lines 15, 16, 17, etc., being in more advanced circular position than the outer lines 15', 16', 17', etc.; while all the orifices maintain radial positions and closely meet at the apex 23 of the cone. By this construction of the cone it is seen that there is a tendency to give the issuing spray of mixed fuel or air a spiral or twirling effect so that it is thoroughly mixed, and is limited by a substantially conical surface as it proceeds out of the cone orifices.

The contact surface of the ring 21—22 is so chosen as to meet the requirement of maintaining a constant temperature of the conical cap.

The following points enter into the matter of maintaining a constant temperature in the explosion chamber of the engine to wit:

The surface of the ring forming the top of the conical cap which is in contact with the head of the cylinder causes a transfer of heat from said ring to the cylinder head which is in proportion to the area of this surface.

The conical cap assumes a temperature in accordance with the cycle, it is maximum at the time of the explosion, and minimum at the end of the admission stroke.

The temperature of the cap is a factor of the amount of power developed and is maximum with full load, and at the time of the explosion.

In the case of various low loads and knowing the position of the cap covering the admission valve, the temperature of the cap is maintained constant by reason of the fact that the volume contraction of the introduced gaseous mixture, corresponds to a diminution of the power, and consequently of the produced temperature.

When the engine is running under light load, the admission of fuel is minimum and consequently the cooling produced thereby on the cap is minimum.

The desired minimum temperature of the conical cap is maintained at the proper value by the mere transfer of heat through the surface of the ring in contact with the cylinder head which must thereof be calculated for this purpose.

That minimum temperature (which, as above stated, corresponds to the end of the admission stroke, and remains the same whatever the load of the engine and the kind of fuel utilized may be) must be sufficient to ensure a satisfactory working of the engine on no load with the heavy fuel.

In the case of various good sized loads including the full load, the volume of the admitted gaseous mixture increases and tends to cause a cooling of the conical cap, which is compensated for by the heating, due to the increase of power produced.

In short, the cooling curve caused by the increasing admission of fuel is the reverse of the heating curve caused by the increasing power explosion.

Consequently, by calculating the contact surface of the ring of the conical cap with the cylinder head for permitting a sufficient temperature of the cap for running of the engine under light load, the increases and decreases of temperature during the function of the load can be equilibrated in such a manner that it may be said that the temperature of the parts remain practically constant at one and the same point of the cycle.

The pitch of the helical slots is such that the spiral jets of fuel spray only reach the wall of the cylinder upon the circumferential circle corresponding to the lowest point of the outlet stroke.

With regard to the angle of the slots or apertures which must be formed in the conical cap, it is seen that same depends on the travel of the engine piston and the diameter of bore of the cylinder, the projection of the fuel forming a mixing cone of fuel and air having for its base the diameter of the cylinder, and for its height the stroke of the piston plus the height of the explosion chamber. As can be seen from the Figure 1 of the drawing, the degree of inclination of the cone-shaped bottom of the conical cap, can be made to suit almost any size of cylinder and engine stroke, the limiting surfaces of the line of the spray coming out of the cap issuing practically at right angle, to the angular bottom of the cap and in a twirling sweep around the interior of the chamber.

Starting up of the engine is effected with gasoline, or with other light fuel as in the case of an ordinary engine.

The object of this is to raise the inner cap to a suitable temperature; the time necessary to accomplish this is very short, and depends on the size of the cylinder and the piston stroke.

As soon as the necessary temperature is reached, the heavy fuel (of the gas-oil type) is admitted into the carburettor and the latter then operates under conditions similar to those which prevail when it is operating on light fuel.

The automatic water injecting device 5 mounted upon the carburettor provides for admission of the water required for the use of the heavy fuels, in proportion to the power required and without supervision.

In practice the operation of the engine takes place in an absolutely normal manner whatever the load at which the engine is required to operate. It is also noted that when the present invention is used that no undesirable fouling of the engine parts takes place even after long and continuous use.

The invention naturally includes the use of a plurality of caps or castings covering a plurality of inlet valves which admit air and fuel into each cylinder of an engine. Similarly it is to be clearly understood that the cap particularly described and illustrated herein may, without going outside the scope of the invention, be replaced by any similar structure formed in such a way as to compel the combustible fuel mixture to become divided into a series of helical fluid streams maintained at a given temperature.

I claim:—

A device for adapting an internal combustion engine having an inlet valve, a cylinder head, an explosion chamber and a piston to use optionally either with heavy or light fuel, said device comprising a hollow cap having a substantially annular portion fixed to the cylinder head and surrounding the inlet valve, a substantially conical portion tapering toward the piston, said cap being provided with a plurality of slots located between the apex of the conical portion and the said annular portion, said slots being inclined with respect to the inner and outer surfaces of the conical portion for delivering the gaseous mixture into the explosion chamber in the form of a whirling mass coming in contact with the cylinder wall only at points thereof level with the top of the piston when the latter is in its lowermost position.

CHARLES BUGAUD.